United States Patent
Billmaier et al.

(10) Patent No.: US 8,688,170 B2
(45) Date of Patent: Apr. 1, 2014

(54) PANORAMIC SCENE CAPTURE USING A MOBILE WIRELESS DEVICE

(75) Inventors: James A. Billmaier, Woodinville, WA (US); John M. Kellum, Woodinville, WA (US); David P. Billmaier, Woodinville, WA (US)

(73) Assignee: Patent Navigation, Inc, Woodinville, WA (US)

(*) Notice: Subject to any disclaimer, the term of this patent is extended or adjusted under 35 U.S.C. 154(b) by 1543 days.

(21) Appl. No.: 11/998,875

(22) Filed: Nov. 30, 2007

(65) Prior Publication Data

US 2008/0207261 A1 Aug. 28, 2008

Related U.S. Application Data

(60) Provisional application No. 60/872,313, filed on Nov. 30, 2006.

(51) Int. Cl.
*H04M 1/00* (2006.01)
*H04M 11/00* (2006.01)
*H04N 7/00* (2011.01)
*G06K 9/20* (2006.01)

(52) U.S. Cl.
USPC .............. 455/556.1; 348/36; 348/39; 348/53; 382/282; 382/284; 709/203; 455/403

(58) Field of Classification Search
None
See application file for complete search history.

(56) References Cited

U.S. PATENT DOCUMENTS

| 6,834,128 | B1* | 12/2004 | Altunbasak et al. | 382/284 |
| 7,133,658 | B2* | 11/2006 | Imagawa et al. | 455/403 |
| 7,477,284 | B2* | 1/2009 | Peleg et al. | 348/53 |
| 7,639,897 | B2* | 12/2009 | Gennetten et al. | 382/299 |
| 2004/0184676 | A1* | 9/2004 | Chapman | 382/282 |
| 2006/0017807 | A1* | 1/2006 | Lee et al. | 348/36 |
| 2006/0120624 | A1* | 6/2006 | Jojic et al. | 382/284 |

* cited by examiner

*Primary Examiner* — Jinsong Hu
*Assistant Examiner* — William Nealon
(74) *Attorney, Agent, or Firm* — FSP LLC

(57) ABSTRACT

A device accessible via a wireless service network includes logic to receive digital frames from a wireless communication device, to identify digital frames that are suitable tiles for a digital panorama, to create a digital panorama from the identified frames, and to associate the panorama with one or more locations on a digital map.

4 Claims, 2 Drawing Sheets

PANORAMIC SCENE CAPTURE USING A MOBILE WIRELESS DEVICE

PRIORITY CLAIM

The present application claims priority to:
United States provisional patent application PANORAMIC SCENE CAPTURE USING A MOBILE WIRELESS DEVICE, having application No. 60/872,313, filed on Thursday, Nov. 30, 2006.

TECHNICAL FIELD

The present disclosure relates to capture and generation of scene panoramas.

BACKGROUND

Digital panoramas provide an immersive experience for people who aren't at a location, but wish to experience the location through digital imagery. The panorama can create an experience of looking around in different directions from the location.

The construction of panoramas typically involves the careful selection of camera angles and the joining of multiple frames of camera information. This may involve rather cumbersome tripods, angular adjustments, and calibration.

Mobile phones now typically include cameras for instant image capture and communication to others. Mobile phones may provide for moving video capture, but do not have capability to quickly and conveniently create panoramas.

SUMMARY

The following summary is intended to highlight and introduce some aspects of the disclosed embodiments, but not to limit the scope of the claims. Thereafter, a detailed description of illustrated embodiments is presented, which will permit one skilled in the relevant art to make and use various embodiments.

A wireless communication device may include and/or involve logic to repeatedly capture digital frames, with time in between each frame capture, and logic to determine if a field of view has changed between a current frame and one or more previously captured frames. The device may include logic to wirelessly communicate the current frame and possibly one or more of the previous frames to a network location if the field of view has changed.

The device may determine if the current frame is suitable for use as a new tile in a scene panorama, and if so communicate the frame to a panorama creation system on the network. The device may determine if the field of view of the current frame extends field of view of the previous frame or frames by less than a full tile, and if so communicate the frame and possibly one or more previous frames to a panorama creation system on the network. The device may determine if the current frame provides a field of view that sits in-between i.e. spans two previous frames, and, if so, send the current frame and possibly one or both of the previous frames to the network.

The device may use, besides the field of view, other characteristics of the captured images comprising image color, texture, lines or other image characteristics, contrast, etc., when determining if the current frame and possibly previous frames may be suitable as part of a panorama. The device may use, besides field of view, the time between captured images and or the mode of capture (such as capturing more than one image by one camera command) when determining if the current frame and possibly previous frames should be considered suitable for processing as part of a panorama.

The device may provide processing on one or all of a set of frames to be considered for use as a panorama in addition to the processing it normally provides for still or moving image capture.

The digital frame capture device may be part of the device, or it may be a peripheral, such as an external digital camera.

The digital frame capture system may send the one or more frames wirelessly to a device located on a network at the approximate time they are captured or later.

The sending of frames to a device located on a network may occur, possibly as a configuration option, automatically when possibly suitable frames for a panorama are found. The sending of frames to a network may occur after a specific operator action such as, for example, a button press or other command indication.

The recognition that a frame and other captured frames are suitable for use as a panorama may include the examination of frames which are on some medium other than the medium of capture of the mobile device.

The recognition that a frame and possibly other captured frames should be sent wirelessly to a network location for processing for panorama suitability may occur solely as a result of operator action.

A system accessible via the wireless network may receive digital frames from the wireless communication device, identify digital frames that are suitable tiles for a digital panorama, and may create a digital panorama from the identified frames. The system may associate the panorama with one or more locations on a digital map.

Other system/method/apparatus aspects are described in the text (e.g., detailed description and claims) and drawings forming the present application.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic. Hardware logic may be embodied in circuits. In general, logic may comprise combinations of software, hardware, and/or firmware.

Panoramic Scene Capture System

Figure 1:
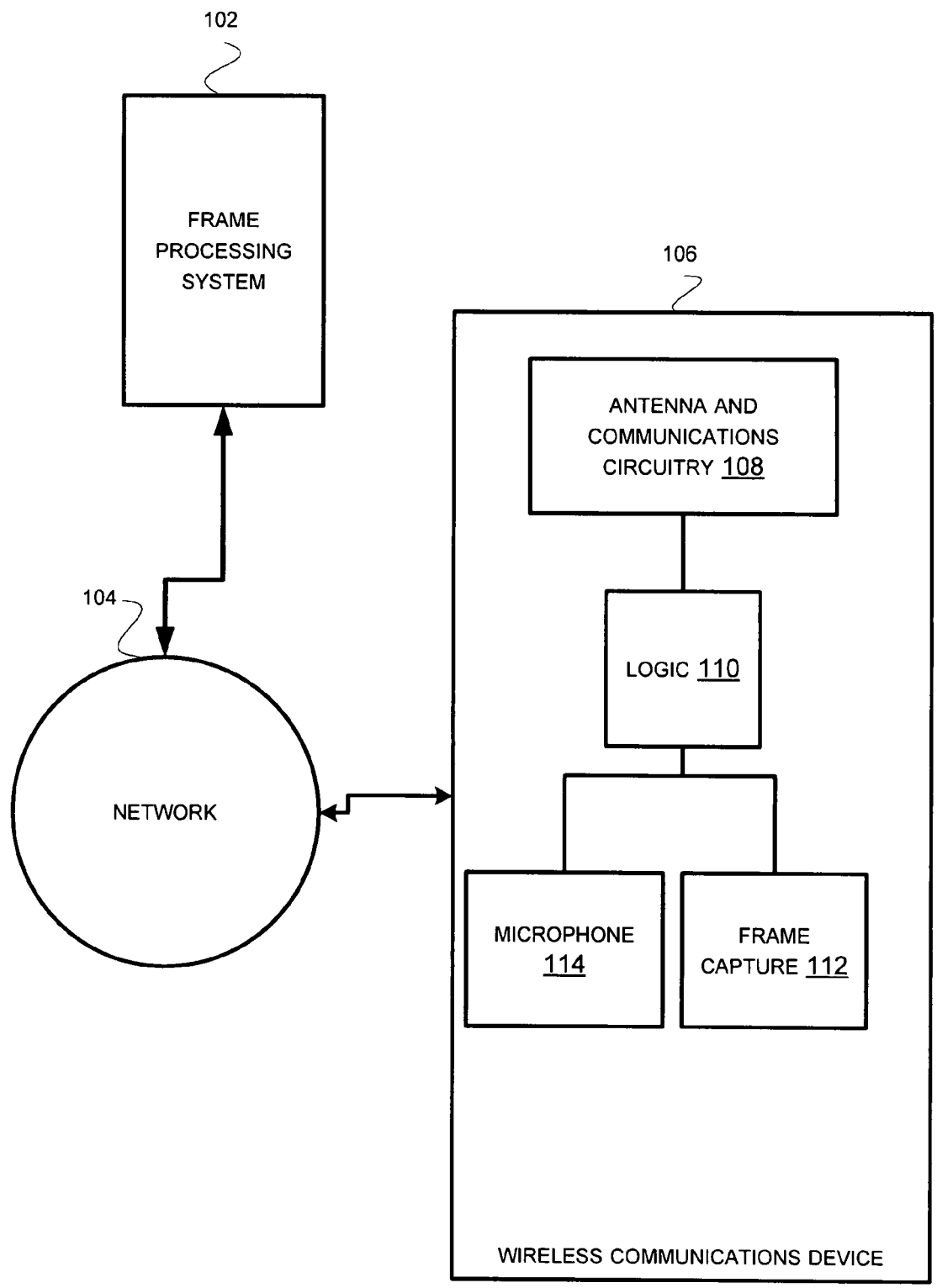
FIG. 1 is a block diagram of an embodiment of a panoramic scene capture system.

FIG. 1 is a block diagram of an embodiment of a panoramic scene capture system. The frame capture system includes, but may not be limited to, a frame processing device 102 at a network location, and a network 104. A wireless communications device 106 may comprise an antenna and communications circuitry 108, logic 110, a frame capture element 112, and a microphone 114. Other elements and/or couplings among the elements have been omitted as they would be apparent to skilled practitioners in the relevant art(s).

The frame processing device 102 accepts frames sent to the network 104 by the wireless communications device 106. The frame processing device 102 may be, for example, one or more servers for accepting video input and processing and/or storing the video input. One example of the frame processing device 102 is an Internet-accessible media and/or map server system.

The network 104 provides a communications path for frames being communicated to the frame processing device 102 by the wireless communications device 106. The network 104 may be a wireless service network, coupled to the Internet or an intra-net via a gateway device (not shown). Examples of wireless service networks include cellular networks such as provided by Cingular, Verizon, and T-mobile, and/or short or medium range wireless networks such as those found in coffee houses, cafes, and hotels and employing Wi-Fi or other short or medium range wireless capability.

The wireless communications device 106 is a device with electronics, logic, and data storage as needed to capture, analyze, and wirelessly communicate digital frames using a network 104 to another to the frame processing device 102. The antenna and communications circuitry 108 provides the capability to receive and transmit signals for wireless communications. The logic 110 provides a capability to analyze information received including information contained in captured digital frames and cause the digital frames to be transmitted in outgoing communications when appropriate. The frame capture element 112 accepts incoming light and creates digital information from the image. In some embodiments, the frame capture element 112 may be a digital camera external to the wireless device 106.

The microphone 114 accepts sound input. The microphone 114 is optionally present and may provide, in some embodiments, captured sound to be sent with frames to the frame capture device 102 at the network location.

Other examples and/or embodiments of a frame processing device 102, a network 104, a wireless communications device 106, a frame capture element 112, and a microphone 114 may be apparent to skilled practitioners in the relevant art(s).

Conditional Communication of Captured Frames

The wireless device 106 may repeatedly capture digital frames, with time in between each frame capture, and determine if a field of view has changed between a current frame and one or more previously captured frames. If the field of view has changed to a predetermined extent, the device 106 may wirelessly communicate the current frame to a network location such as the frame processing device 102, for processing into a panorama.

The wireless device 106 may include logic to determine if the current frame is suitable for use as a new tile in a scene panorama, and may communicate the frame to the frame processing device 102 only if the frame is suitable for use as a tile (e.g. doesn't overlap too much with previous frames, has a consistent vertical angle with previous frames, and includes at least some information for continuity with previous frames).

The device 106 may determine if the field of view of the current frame extends field of view of the previous frame or frames by less than a full tile, and if so communicate the frame and possibly one or more previous frames to a panorama creation system on the network. The device 106 may determine if the current frame provides a field of view that sits in-between i.e. spans two previous frames, and, if so, send the current frame and possibly one or both of the previous frames to the network.

The device 106 may use, besides the field of view, other characteristics of the captured images comprising image color, texture, lines or other image characteristics, contrast, etc., when determining if the current frame and possibly previous frames may be suitable as part of a panorama. The device 106 may use, besides field of view, the time between captured images and or the mode of capture (such as capturing more than one image by one camera command) when determining if the current frame and possibly previous frames should be considered suitable for processing as part of a panorama.

The device 106 may provide processing on one or all of a set of frames to be considered for use as a panorama in addition to the processing it normally provides for still or moving image capture.

The mobile digital frame capture device 106 may send the one or more frames wirelessly to a device located on a network at the approximate time they are captured or later.

The sending of frames to a device located on a network may occur, possibly as a configuration option, automatically when possibly suitable frames for a panorama are found. The sending of frames to a network may occur after a specific operator action such as, for example, a button press or other command indication.

The recognition that a frame and other captured frames are suitable for use as a panorama may include the examination of some frames which are on some medium other than the medium of capture of the mobile device.

The recognition that a frame and other captured frames should be sent wirelessly to a network location for processing for panorama suitability may occur solely as a result of operator action.

Panoramas for a Network Map Server

The frame processing device 102 may include logic to receive digital frames from the wireless communication device 106, logic to identify digital frames that are suitable tiles for a digital panorama, logic to create a digital panorama from the identified frames, and logic to associate the panorama with one or more locations on a digital map.

In this manner, digital maps served from a network location may provide the capability for users to view panoramas of locations on the maps. These panoramas may be built from images captured ad hoc by cell-phone carrying visitors to the locations. One visitor may contribute one or several frames of the panorama, a later visitor may contribute other frames, and so on, until a complete panorama is available. In fact, the cell phones of the visitors and the visitors themselves may not do anything special to contribute to the panorama. The visitors may merely capture and contribute frames, and the frame processing device 102 may provide all logic necessary to determine if the frame is suitable for use in a panorama, and may thus build panoramas incrementally over days, months, or years, as different frames are provided from different users.

Panoramic Scene Capture Process

Figure 2:
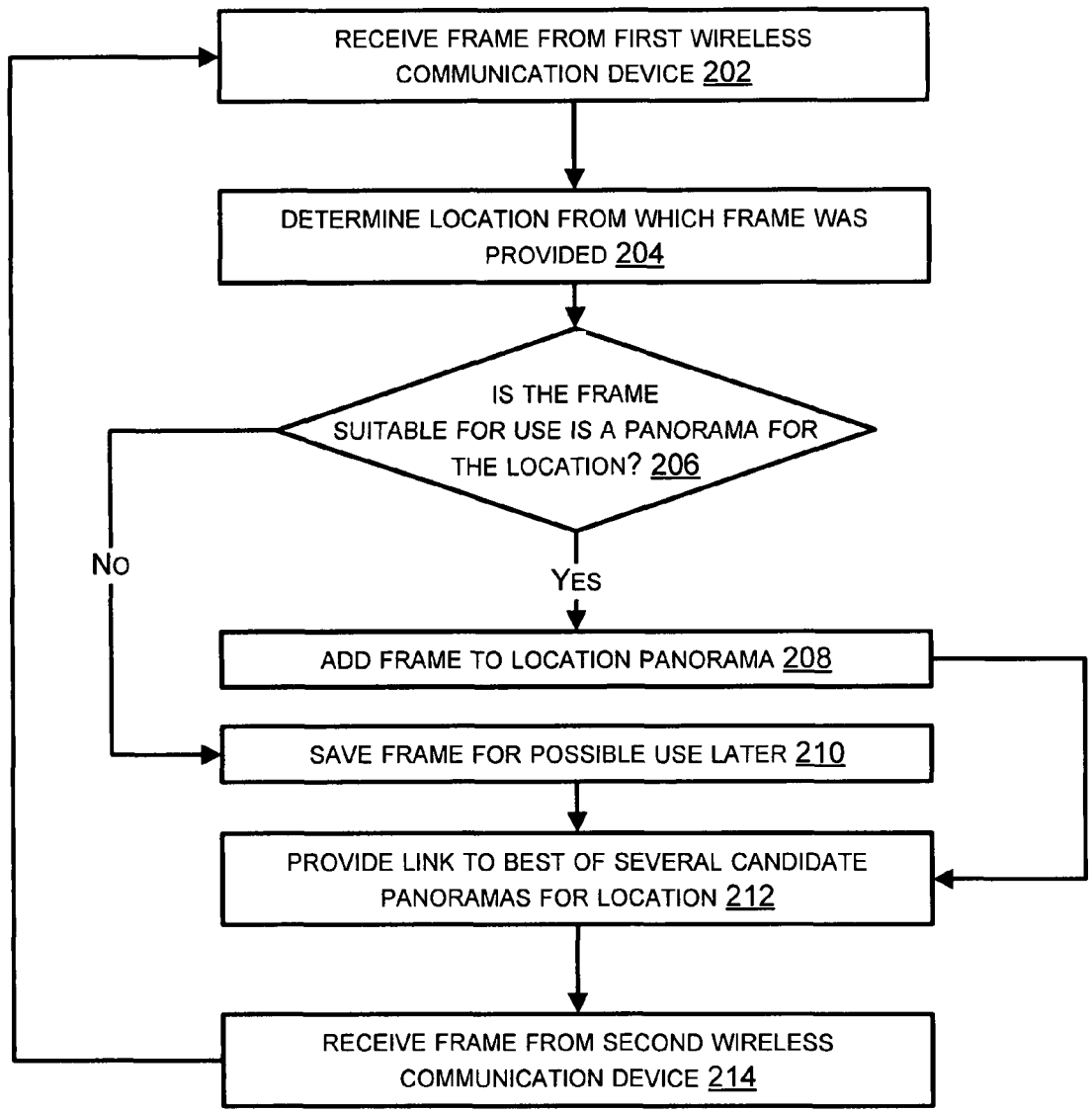
FIG. 2 is an action flow diagram of an embodiment of a panoramic scene capture process.

FIG. 2 is an action flow diagram of an embodiment of a panoramic scene capture process.

At 202 receive a frame is received from a first wireless communication device. At 204 the location from which frame was provided is determined.

If, at 206, it is determined that the frame is suitable for use in a panorama for the location, the frame is added to a panorama of the location at 208. Otherwise, at 210 the frame is saved for possible later use in a panorama.

There may be several panoramas in existence concurrently for a particular location, each one built from different frames and providing a different point of view. The system may select, either randomly or based upon some criteria, which of the several panoramas to associate with the location at a particular point in time or in response to a query or other event involving the location.

At 112 a link is provided to the best of several candidate panoramas for the location 112. At 114 a frame is received from a second wireless communication device 114, and the process of adding the frame to one or more panoramas repeats.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A wireless communication system comprising non-transitory machine memory and circuits, the non-transitory machine memory and circuits comprising logic adapted to cause the system to:

repeatedly receive digital frames, with time of one or more days in between each frame, each frame received from a different wireless device associated with a different cellular user and each frame taken at a different view of the same general location;

the general location from which each frame is received;

determine if each frame is suitable for addition to one or a plurality of existing different panoramas for the general location, the existing different panoramas constructed from previously received frames;

store the frames as stored frames in a manner associated with the general location and separate from the existing different panoramas if it is determined that the frames are not currently suitable for adding to one of the existing different panoramas for the general location;

adding the stored frames to one of the existing different panoramas after additional frames are received which render the stored frames suitable for adding to one of the existing different panoramas for the general location.

2. The system of claim 1, the logic further adapted to:

associate the scene panorama with a location on a digital map.

3. The system of claim 1, the time between frames from different devices being days, months, or years.

4. The system of claim 1, the scene panorama to add to chosen from among multiple stored scene panoramas for the location for the currently received frame.

\* \* \* \* \*